G. F. JENKINS.
PRUNING IMPLEMENT.
APPLICATION FILED APR. 1, 1909.
930,183.
Patented Aug. 3, 1909.
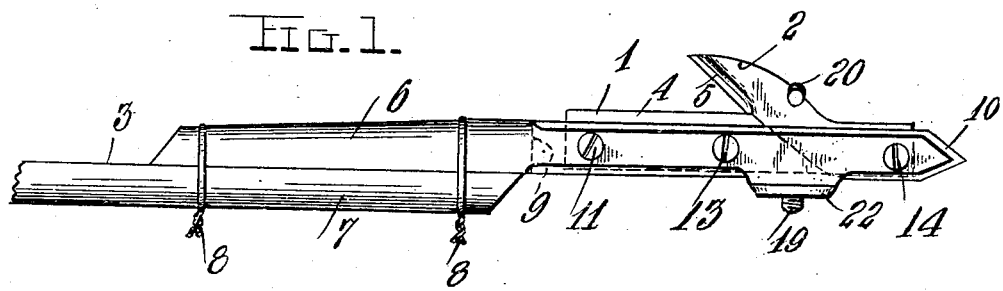
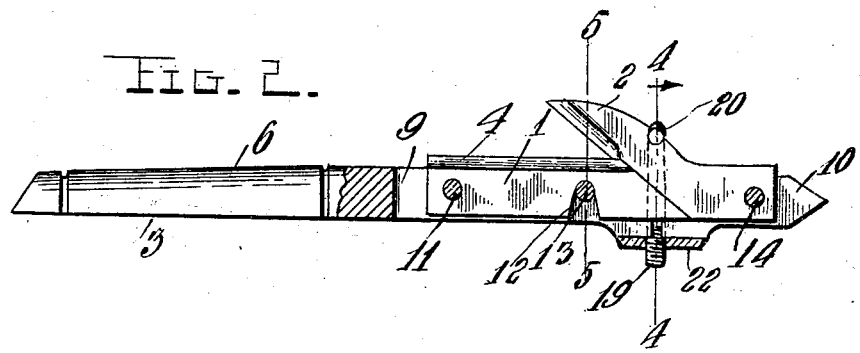
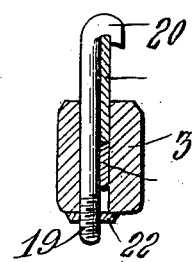
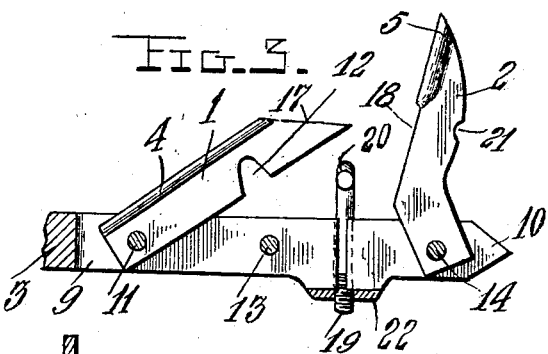
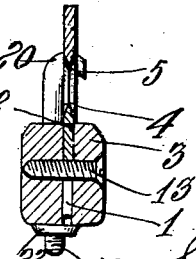
Witnesses
Morris Lessin
E. M. Ricketts
Inventor
G. F. Jenkins
By Watson E. Coleman
Attorney

UNITED STATES PATENT OFFICE.

GEORGE FRED JENKINS, OF BARNSTEAD, NEW HAMPSHIRE.

PRUNING IMPLEMENT.

No. 930,183.            Specification of Letters Patent.           Patented Aug. 3, 1909.

Application filed April 1, 1909. Serial No. 487,329.

*To all whom it may concern:*

Be it known that I, GEORGE F. JENKINS, a citizen of the United States, residing at Barnstead, in the county of Belknap and State of New Hampshire, have invented certain new and useful Improvements in Pruning Implements, of which the following is a specification, reference being had to the accompanying drawings.

This invention relates to improvements in pruning implements of that class especially adapted for cutting from trees and shrubbery, branches and twigs on which moths nests are supported.

One object of the invention is to provide a simple and practical pruning knife or implement of this character which will be light in weight so that it may be used upon a comparatively long pole and readily manipulated with one hand.

Another object of the invention is to provide an implement of this character having opposing or converging cutting blades so mounted that they may be readily separated to permit them to be effectively sharpened.

With the above and other objects in view, the invention consists of the novel features of construction and the combination and arrangement of parts hereinafter fully described and claimed, and illustrated in the accompanying drawings, in which—

Figure 1 is a side elevation of the improved pruning implement; Fig. 2 is a longitudinal section; Fig. 3 is a similar view showing the blades open to permit them to be sharpened; and Figs. 4 and 5 are transverse sections taken, respectively, on the planes indicated by the lines 4—4 and 5—5 in Fig. 2.

The invention comprises two cutting blades 1, 2 arranged in converging relation on a suitable handle or pole 3. The inner or lower blade 1 extends longitudinally of the pole while the blade 2 projects at an acute angle from the pole so that a V-shaped space is provided between the beveled cutting edges 4, 5 of the two blades.

The pole or handle 3 may be of any suitable form and construction and may be made in one piece or in one or more sections. As illustrated, the blades are fixed to a short outer section 6, which latter is secured to a long pole section 7 by means of binding wires 8 or any other suitable detachable fastening means.

The blades 1, 2 are preferably secured in a longitudinal kerf or slot 9 which extends inwardly a suitable distance from the beveled or pointed outer end 10 of the pole section 6. The inner blade 1 is in the form of a rectangular plate having its outer edge beveled to provide the cutting edge 4 and its lower end pivoted in the slot 9 by means of a screw, bolt or the like 11. The upper portion of the inner edge of the blade 1 is formed with a notch 12 adapted to receive a stop screw or bolt 13 passed through the pole section 6 and intersecting the slot 9.

The outer or upper blade 2 is angular in shape, its short upper end being pivoted by a screw or bolt 14 in the upper portion of the slot and the lower portion of the inner edge of its long arm being beveled to provide the cutting edge 5. The upper portion of the inner edge of the long arm of the blade 2 is formed with an angular portion 18 to engage the beveled end 17 of the blade 1. The two blades are held in engagement and in the slot 9 of the pole section 6 by means of a clamping bolt 19 passed transversely through an opening in the pole section 6 and having a hook-shaped end 20 to engage a notch 21 in the outer edge of the blade 2. The other projecting screw threaded end of the bolt 9 receives a retaining nut 22 which is of semi-elliptical form so that it will present no abrupt shoulders on which the twigs and branches of the trees will catch.

From the foregoing it will be seen that the invention provides an exceedingly simple and practical pruning knife which may be produced at a small cost and which will be strong and durable in use. The peculiar arrangement of the cutting blades causes it to easily cut twigs and branches of trees, shrubbery and the like on which the nests of brown tail moths are supported; and it also permits the implement to be easily operated with one hand. The peculiar manner of fastening the blades causes them to be effectively secured to the pole or handle and also enables them to be quickly and easily separated, as shown in Fig. 3 of the drawings so that the cutting edges of said blades may be conveniently and effectively sharpened.

Having thus described the invention what is claimed is:

1. A pruning implement comprising a handle, a pair of cutting blades pivoted thereon and having their cutting edges arranged in converging relation, a supporting member for one of said blades and a single fastening for holding said blades against movement upon their pivots.

2. A pruning implement comprising a handle, a pair of cutting blades pivoted thereon and having their cutting edges arranged in converging relation, said blades having portions of their free ends engaged with each other, a supporting member for one of said blades and a hook bolt in the handle and engaged with the outer blade, whereby both of the blades will be held against movement on the handle.

3. A pruning implement comprising a handle formed with a longitudinal slot, an inner blade pivoted at its lower end in said slot, a stop to limit the inward swinging movement of the upper end of the blade, an outer blade pivoted in the upper portion of said slot, the outer blade being adapted to engage the inner one and retain it in engagement with its stop and a hook bolt passed through the handle and engaged with the outer blade, whereby both blades will be held against movement in the handle.

4. A pruning implement comprising a pole, a longitudinally slotted outer pole section detachably secured to one end of said pole, inner and outer blades pivoted in said slot of the outer pole section and engaged with each other, and a hook bolt passed through the outer pole section and engaged with the outer blade whereby both blades will be held against movement in the outer pole section.

In testimony whereof I hereunto affix my signature in the presence of two witnesses.

GEORGE FRED JENKINS.

Witnesses:
 EDWARD A. LANE,
 ALBERT J. RANLET.